(12) United States Patent
Schäfer et al.

(10) Patent No.: US 7,159,904 B2
(45) Date of Patent: Jan. 9, 2007

(54) STEERING COLUMN FOR A MOTOR VEHICLE

(75) Inventors: Burkhard Schäfer, Ganderkesee (DE); Sabine Lindhorst, Achim (DE)

(73) Assignee: ZF Lemförder Metallwaren AB (DE)

( * ) Notice: Subject to any disclaimer, the term of this patent is extended or adjusted under 35 U.S.C. 154(b) by 0 days.

(21) Appl. No.: 11/082,529

(22) Filed: Mar. 17, 2005

(65) Prior Publication Data

US 2005/0161930 A1 Jul. 28, 2005

Related U.S. Application Data

(63) Continuation of application No. PCT/DE03/04183, filed on Dec. 18, 2003.

(30) Foreign Application Priority Data

Jan. 14, 2003 (DE) ................................ 103 01 142

(51) Int. Cl.
*B62D 1/187* (2006.01)

(52) U.S. Cl. ......................................... 280/775; 74/493

(58) Field of Classification Search ................ 280/775, 280/779; 74/493
See application file for complete search history.

(56) References Cited

U.S. PATENT DOCUMENTS

| 5,178,411 | A | * | 1/1993 | Fevre et al. | ................ | 280/775 |
| 5,806,890 | A | * | 9/1998 | Sugiki et al. | ................ | 280/775 |
| 6,079,743 | A | | 6/2000 | Grams | | |
| 6,886,859 | B1 | * | 5/2005 | Braun et al. | ................ | 280/775 |
| 2004/0032121 | A1 | * | 2/2004 | Schafer et al. | .............. | 280/775 |

FOREIGN PATENT DOCUMENTS

| DE | 42 17 664 A1 | 12/1992 |
| DE | 196 41 152 A1 | 4/1998 |
| DE | 196 41 152 C2 | 9/1998 |

* cited by examiner

*Primary Examiner*—David R. Dunn
(74) *Attorney, Agent, or Firm*—McGlew & Tuttle PC

(57) ABSTRACT

An electrically adjustable steering column as it is used in motor vehicles. The present invention pertains, in particular, to a steering column that has at least two adjusting units, which are arranged on an adjusting spindle and can be moved in the axial direction of the adjusting spindle. The steering column comprises according to the present invention:

a mounting plate (9),
a steering column jacket (6) with a steering wheel connection (12),
an electrically driven adjusting device for the longitudinal adjustment and the tilt adjustment of the steering column (2), wherein the adjusting device comprises:
an electric drive unit (1) for rotatingly driving a one-part adjusting spindle (2),
two adjusting units (3 and 4, respectively), which are arranged on the adjusting spindle (2) and can be moved in the axial direction of the adjusting spindle (2), wherein the first adjusting unit (4) is pivotably connected with the mounting plate via a pivoted lever (7) such that the axial movement of the adjusting unit (4) is mechanically transmitted [sic—converted—Tr.Ed.] into a tilting movement of the steering column jacket (6), and the second adjusting unit (3) is connected with the mounting plate via a fastening element (8) such that the axial movement of the first adjusting unit (3) is mechanically transmitted [sic—converted—Tr.Ed.] into a longitudinal movement of the steering column jacket (6), wherein one of the two adjusting units (3 and 4, respectively) is in permanent functional connection with the adjusting spindle (2) and is moved in the axial direction during the rotation of the adjusting spindle (2) and the other of the two adjusting units (4 and 3, respectively) can be brought into functional connection with the adjusting spindle (2) only by activating a switching device (5).

23 Claims, 5 Drawing Sheets

STEERING COLUMN FOR A MOTOR VEHICLE

CROSS REFERENCE TO RELATED APPLICATION

This is a continuation of and claims the benefit (35 U.S.C. §120 and 365(c)) of copending International Application PCT/DE 2003/004183 of Dec. 18, 2003, which designated inter alia the United States and which claims the priority of German Application DE 103 01 142.0 of Jan. 14, 2003. The entire contents of each application is hereby incorporated by reference in its entirety.

FIELD OF THE INVENTION

The present invention pertains to an electrically adjustable steering column, as it is used in motor vehicles. The present invention pertains, in particular, to a steering column that has at least two adjusting units, which are arranged on an adjusting spindle and are movable in the axial direction of the adjusting spindle.

BACKGROUND OF THE INVENTION

In vehicle construction, motor vehicle steering column units are installed in passenger cars and trucks. The general design of such units is characterized in that there is a section that can be telescoped and tilted for each direction of adjustment (longitudinal adjustment and tilt adjustment), and each section can be activated by the user via a coupling and an adjustment in the corresponding direction can thus be performed.

Such a steering column unit is disclosed in patent DE 196 41 152 C2 and shown in attached FIGS. 4 and 5. It comprises a steering column housing 14, a steering column 15 arranged therein, and an electrically driven adjusting device for the longitudinal adjustment and for the tilt adjustment of the steering column 15. The adjusting device comprises an electric motor 17, which rotates a one-part adjusting spindle 18, as well as two spindle nuts 19 in a respective bearing housing 16, which said spindle nuts are mounted movably in the axial direction of the adjusting spindle 18. An adjusting mechanism (connecting lever 20, tilting lever 21) as well as a switching device 22 (lifting magnet) each are provided for the longitudinal movement and for the tilting movement, and a temporary rigid connection is established by the user between the respective adjusting device 22 and the spindle nut 24 corresponding to the switching device 22 during the adjustment. The respective spindle nut 19 forms a so-called adjusting unit with the respective bearing housing 16 and the respective switching device 22. An adjusting unit, which has a switching device 22 (for example, a lifting magnet), will be called a coupling in the further course of the specification.

The mode of operation of the adjusting mechanism is explained in greater detail on the basis of FIG. 5. The adjusting spindle 18, which is driven at one of its ends by an electric motor (not shown in FIG. 5), is shown in an axial sectional view. Two thrust bearings 23, in which a spindle nut 24 each is mounted, are located at a defined distance from one another. The internal thread of one spindle nut 24 corresponds to the external thread of the adjusting spindle 18. The moment of friction between the adjusting spindle 18 and the spindle nut 24 is greater than the moment of friction between the spindle nut 24 and the thrust bearing 23, so that a rotary movement of the adjusting spindle 18 brings about rotary movements of both spindle nuts 24 in the same direction without a change taking place in the position of the thrust bearings 23 with the spindle nuts 24 contained therein in the axial longitudinal direction. The right-hand adjusting unit is provided with a switching device 22, which is a lifting magnet in this exemplary embodiment. This lifting magnet 22 has a pin 25, which can be extended from the lifting magnet housing in the direction of the central axis of the adjusting spindle 18 during the actuation of the lifting magnet 22 and engages an opening 26 of the spindle nut 24. As a result, a rigid mechanical connection is brought about by the switching device 22 (lifting magnet) between the thrust bearing 23 and the spindle nut 24, so that the rotary movement of the spindle nut 24 is blocked and the rotation of the adjusting spindle 18 inevitably leads to an axial displacement of the spindle nut 24. This axial displacement is converted by a suitable mechanism (by means of the connecting lever 20 and the tilting lever 21) into an axial displacement or tilting of the steering column housing 14.

In a steering column of the above-described design and possessing the above-mentioned properties, the direction of adjustment can be selected by actuating the corresponding adjusting unit or coupling.

SUMMARY OF THE INVENTION

The object of the present invention is to provide a steering column for a motor vehicle, which can be adjusted electrically with one motor and has considerably fewer components, especially electric components, and is thus more compact, on the one hand, and is, on the other hand, less liable to fault and less expensive.

The above-mentioned object is accomplished by a motor vehicle steering column with
  a mounting plate,
  a steering column jacket with steering wheel connection,
  an electrically driven adjusting device for the longitudinal adjustment and tilt adjustment of the steering column,
    wherein the adjusting device comprises:
  an electric drive unit for rotatingly driving a one-part adjusting spindle,
  two adjusting units, which are arranged on the adjusting spindle and are movable in the axial direction of the adjusting spindle, wherein the first adjusting unit is connected pivotably with the mounting plate via a pivoted lever such that the axial movement of the adjusting unit is mechanically transmitted or converted into a tilting movement of the steering column jacket, and the second adjusting unit is connected with the mounting plate via a fastening element such that the axial movement of the second adjusting unit is mechanically transmitted or converted into a longitudinal movement of the steering column jacket, wherein one of the two adjusting units is in permanent functional connection with the adjusting spindle and is moved in the axial direction during rotation of the adjusting spindle and the other of the two adjusting units can be brought into functional connection with the adjusting spindle only by activating a switching device.

The adjusting unit that is permanently in functional connection with the adjusting spindle is advantageously a simple spindle adjusting nut.

By contrast, the adjusting unit that is to be brought into functional connection with the adjusting spindle by activating a switching device only comprises a housing, in which a spindle nut is mounted rotatably, which is prevented from rotating together with the adjusting spindle only by activating the switching device.

In various advantageous embodiments of the present invention, the switching device is a lifting magnet, a magnetic friction brake, an eddy current brake or a hysteresis brake.

The design of the steering column according to the present invention makes it possible to arrange an adjusting spindle with the adjusting units and with the electric drive unit under the steering column jacket in a compact manner. Thus, there is sufficient space for air bags or crash pads to the right and left of the steering column.

To make possible a direct translation of the movement between the steering column jacket and the mounting plate fastened to the body, the fastening element is rigidly connected with the mounting plate.

The fastening element has an elongated hole, in which the second adjusting unit is guided such that this adjusting unit and consequently also the steering column jacket can be moved at right angles in relation to the mounting plate.

The mounting plate advantageously has a flange with a pivot pin, which is mounted rotatably in a flange of the steering column jacket.

By contrast, the flange of the steering column jacket has an elongated hole, in which the pivot pin is guided such that the mounting plate and the steering column jacket can be displaced in parallel to one another.

The pivoted lever is also mounted rotatably in the flange of the mounting plate via a pivot pin on the body side and via a pivot pin of the first adjusting unit via on the steering column jacket side.

Further features, properties and advantages of the present invention will now be explained on the basis of exemplary embodiments and with reference to the accompanying drawing figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 4:
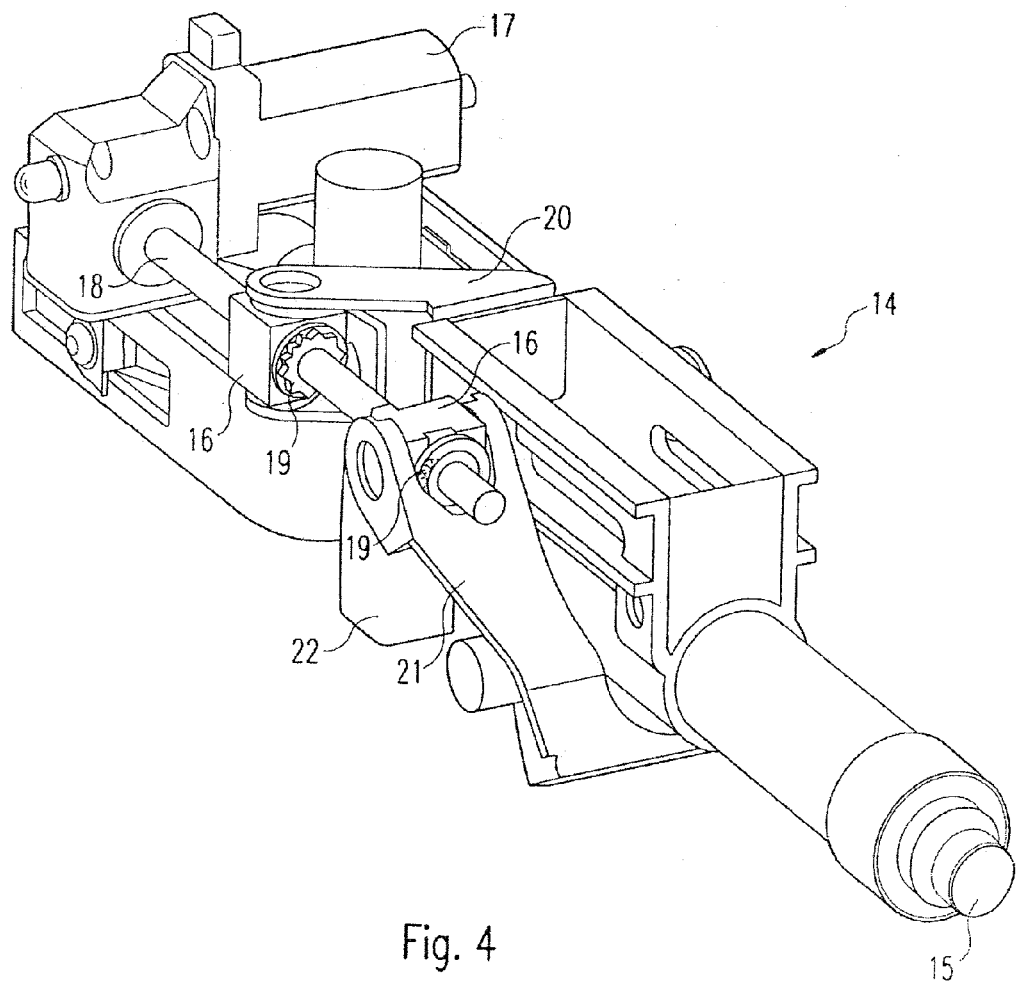
FIG. 4 is a perspective view of an adjustable motor vehicle steering column according to the state of the art in the uninstalled state.
Figure 5:
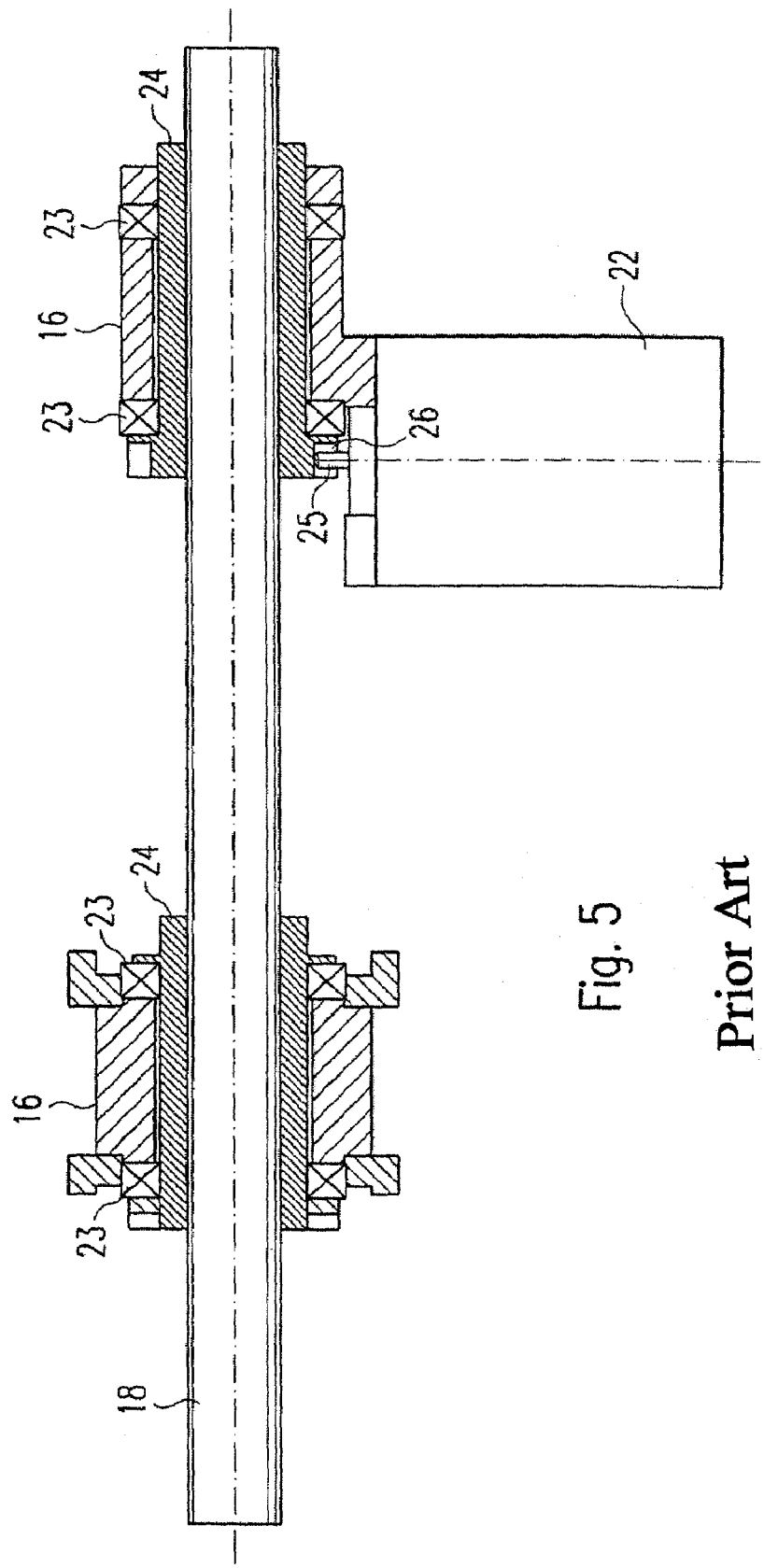
FIG. 5 is an axial section through the adjusting spindle of the motor vehicle steering column shown in FIG. 4 with the adjusting unit belonging to the particular coupling.

The state of the art was already shown and explained in detail above on the basis of FIGS. 4 and 5.

Figure 1:
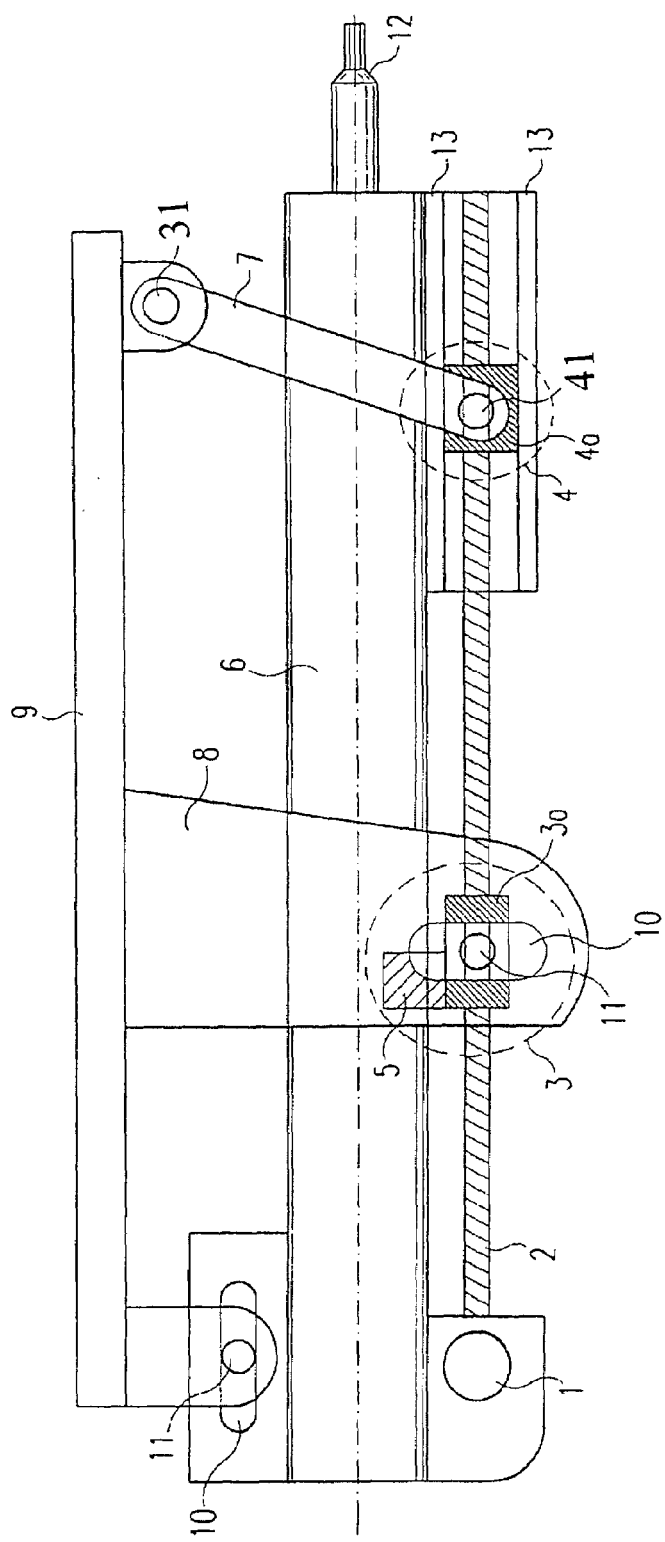
FIG. 1 is a simplified, partially cut-away side view of a one-motor steering column that can be moved telescopically and in a height-adjustable manner according to the present invention with only one coupling.

FIG. 1 shows a partially cut-away side view of a one-motor, electrically adjustable steering column, which has only one coupling 3 according to the present invention. The steering wheel connection 12 is connected with a steering column jacket 6, which can be axially displaced or pivoted in one plane—preferably vertically—in relation to a mounting plate 9 fixed to the body.

The steering column jacket is connected with the mounting plate 9 via three elements in different ways:

The first element is a pivot pin 11, which is rigidly connected with a flange of the mounting plate 9 and is guided in an elongated hole 10 of a flange connected with the steering column jacket 6 such that the steering column jacket 6 can be displaced in parallel to its own axis, on the one hand, and can be pivoted around this pivot pin 11, on the other hand.

The second element is a pivoted lever 7, which is mounted on the mounting plate side rotatably around a pivot pin 31 or also a riveted or plug type connection. The other side of the pivoted lever 7 is likewise connected rotatably (via a pivot pin 41) with the spindle adjusting nut 4a. The spindle adjusting nut 4a is guided in a connecting link guide 13, i.e., it is a sliding block, which is guided linearly and in parallel to the steering column jacket 6 in a contour 13 located in the steering column jacket.

Figure 2:
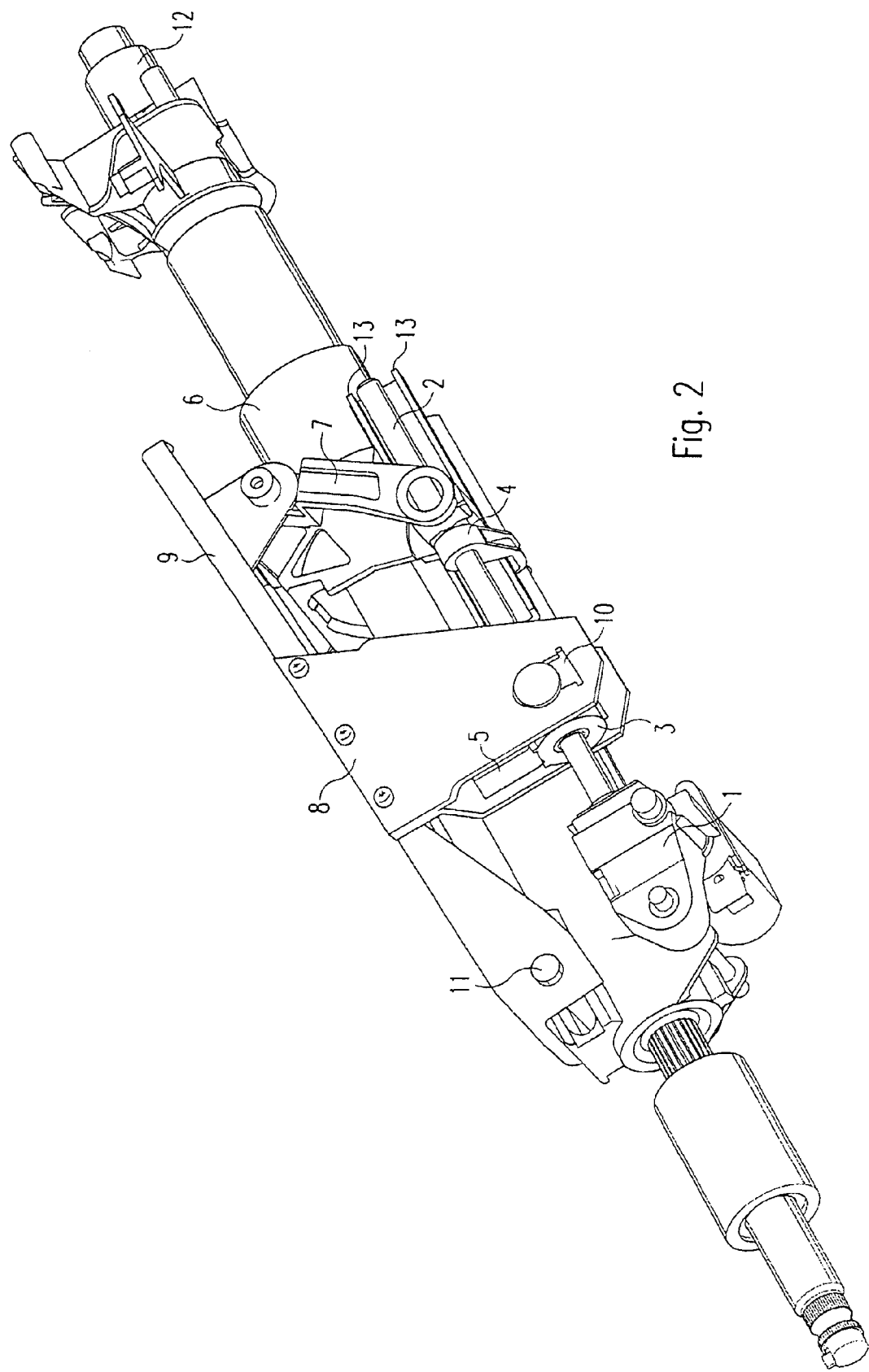
FIG. 2 is a first perspective side view of the steering column according to the present invention.
Figure 3:
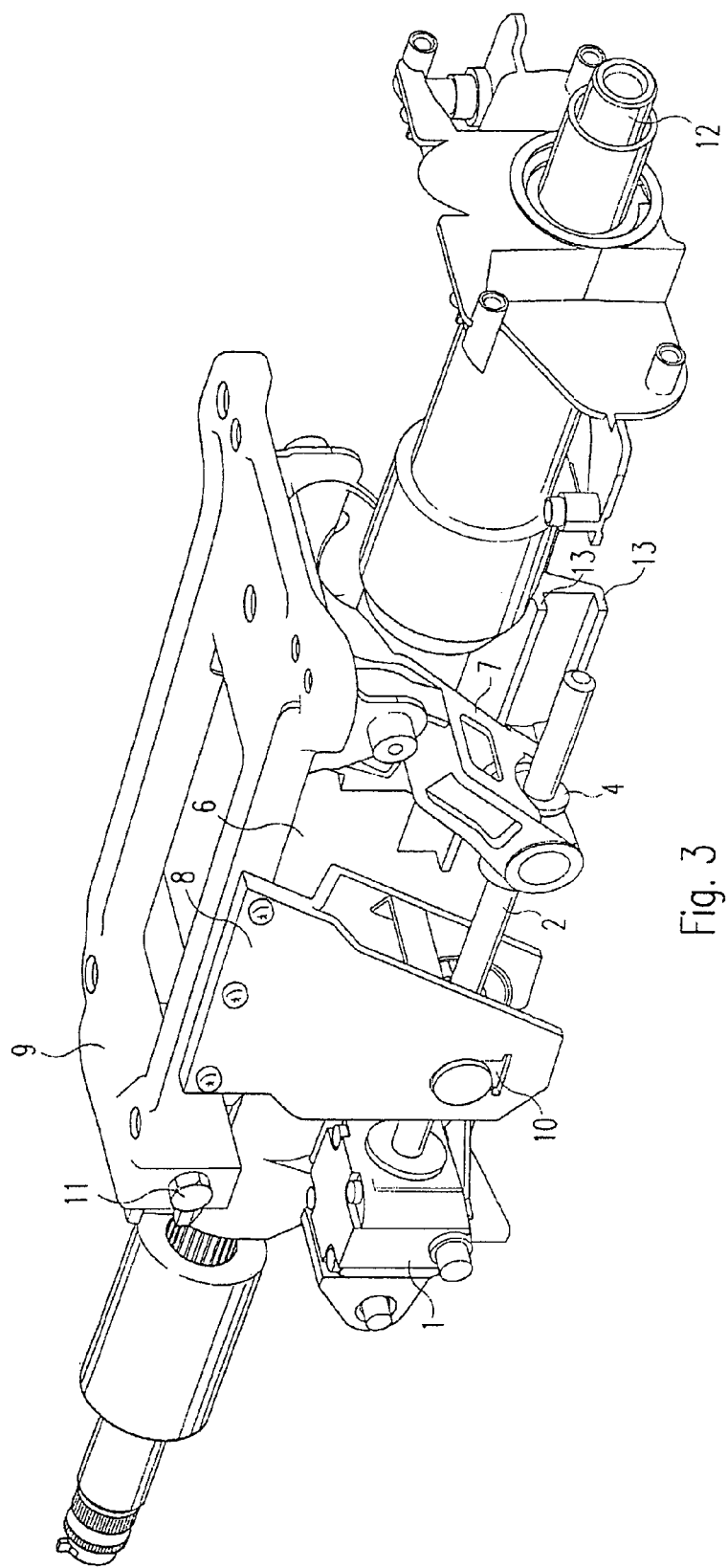
FIG. 3 is a second perspective side view of the steering column according to the present invention.

The third element is a so-called fastening element 8 that is a stable flange, which is screwed to the mounting plate 9 on the mounting plate side (FIGS. 2 and 3) and is guided with a bolt in a vertical elongated hole 10 on the steering column jacket side. This connection permits a vertical movement of the steering column jacket 6 in relation to the mounting plate 9. The bolt is rigidly connected with a coupling 3.

Both the spindle adjusting nut 4a and the coupling 3 are screwed at a defined distance from one another onto an adjusting spindle 2, which extends in parallel to the axis of the steering column jacket 6 and can be set into rotation with an electric motor 1 fastened to the steering column jacket 6. The direction of rotation of the adjusting spindle 2 is determined by the direction of rotation of the motor 1.

The spindle adjusting nut 4a is designed such that rotation of the adjusting spindle 2 leads to an axial displacement of the spindle adjusting nut 4a. The direction of the displacement depends on the direction of rotation of the adjusting spindle 2.

The design of the coupling 3 corresponds to that of the two adjusting units according to the state of the art (FIG. 5). A nut, which normally rotates together with the adjusting spindle 2, is located inside the coupling 3. By activating the switching device 5, the rotation of the spindle nut 3a located in a housing can be stopped by non-positive locking (e.g., a friction lock) or positive locking (positive engagement), which causes the entire coupling 3 as well as the spindle adjusting nut 4a to undergo an (equal) axial displacement. The switching device may be a lifting magnet, a magnetic friction brake, an eddy current brake or a hysteresis brake.

This mechanism can be used in the sense of an electric adjustment of the steering column as follows:

The motor 1 is set into rotation by the user or the driver of the vehicle. The direction of rotation is selectable. If the switching device 5 of the coupling 3 is not activated, only the spindle adjusting nut 4a will undergo an axial displacement in the connecting link guide 13, which leads to a pivoting movement of the steering column jacket 6 in relation to the mounting plate 9 via the pivoted lever 7 and thus to an upward or downward movement of the steering wheel.

If the switching device 5 is activated (coupled state), both the spindle adjusting nut 4a and the coupling 3 undergo an axial displacement when the motor 1 is rotating, and only a change in distance relative to the motor 1 will take place and the spindle adjusting nut 4a and the coupling 3 will maintain the relative distance between them. Thus, activation of the coupling 3 brings about no pivoting movement (no height adjustment) but a telescopic withdrawal or extension of the steering wheel, depending on the direction of rotation of the motor.

An important difference between the present invention and an electric steering column adjustment according to the state of the art is the fact that the two adjustments (height adjustment and axial adjustment) cannot be carried out simultaneously with the design according to the present invention (with the restriction of identical direction of rotation of the motor). By activating or deactivating the coupling 3, both adjustments can be performed only mutually. However, this is not a real drawback as the ergonomics and the haptics of humans corresponds to a one-parameter way of thinking anyway.

The one-motor electrically adjustable steering column reduced to a coupling 3 thus represents an optimization, which is manifested primarily for the manufacturer rather that for the user.

Thus, if there is only one coupling 3 (with electric switching device 5), a less complicated control is required, on the whole, within the onboard electronic system. Fewer electric interfaces (e.g., plugs) are necessary. The elimination of a coupling 3 and consequently also of the mounting of a coupling leads to a marked cost reduction. Fewer parts are needed, and the entire steering column can thus be made more compact and consequently with a reduced weight. For example, a ball guide and an axial housing are eliminated due to the steering wheel shaft being integrated in the steering column jacket. The entire steering column can be made thinner and slimmer, and protective pads or other soft materials can therefore be installed to the right and left of the steering column, i.e., in the area in which the knees may impact in case of a crash in order to bring about a better crash behavior.

While a specific embodiment of the invention has been shown and described in detail to illustrate the application of the principles of the invention, it will be understood that the invention may be embodied otherwise without departing from such principles.

What is claimed is:

1. A steering column for a motor vehicle, the steering column comprising:
   a mounting plate;
   a steering column jacket with a steering wheel connection;
   an electrically driven adjusting device for the longitudinal adjustment and the tilt adjustment of the steering column, wherein the adjusting device comprises: a one-part adjusting spindle, an electric drive unit for rotatingly driving said one-part adjusting spindle, a switching device and adjusting units arranged on the adjusting spindle and are movable in the axial direction of said adjusting spindle, said adjusting units including a first adjusting unit connected pivotably with said mounting plate via a pivoted lever such that the axial movement of said adjusting unit is mechanically converted into a tilting movement of said steering column jacket, and including a second adjusting unit connected with said mounting plate via a fastening element such that the axial movement of said second adjusting unit is mechanically converted into a longitudinal movement of said steering column jacket, wherein one of said first adjusting unit and said second adjusting unit is in permanent functional connection with said adjusting spindle and is moved in the axial direction during rotation of said adjusting spindle, and the other of said first adjusting unit and said second adjusting unit can be brought into functional connection with said adjusting spindle only by activating said switching device.

2. A motor vehicle steering column unit in accordance with claim 1, wherein said adjusting unit that is in permanent functional connection with said adjusting spindle is a spindle adjusting nut.

3. A motor vehicle steering column unit in accordance with claim 2, wherein:
   said spindle adjusting nut is not able to rotate together with said adjusting spindle about an axis of said adjusting spindle.

4. A motor vehicle steering column unit in accordance with claim 1, wherein said adjusting unit which can be brought into functional connection with said adjusting spindle only by activating said switching device comprises a housing with a spindle nut mounted rotatably, said spindle nut being prevented from rotating together with said adjusting spindle only by the activation of said switching device.

5. A motor vehicle steering column unit in accordance with claim 1, wherein said switching device is one of a lifting magnet, a magnetic friction brake, an eddy current brake and a hysteresis brake.

6. A motor vehicle steering column unit in accordance with claim 1, wherein said adjusting spindle is accommodated with said adjusting units and said electric drive unit under said steering column jacket in a compact manner.

7. A motor vehicle steering column unit in accordance with claim 1, wherein said fastening element is rigidly connected with said mounting plate.

8. A motor vehicle steering column unit in accordance with claim 1, wherein said mounting plate has a flange with a pivot pin.

9. A motor vehicle steering column unit in accordance with claim 1, wherein said pivoted lever is mounted rotatably in a flange of said mounting plate via a pivot pin.

10. A motor vehicle steering column unit in accordance with claim 1, wherein said pivoted lever is mounted rotatably at said first adjusting unit via a pivot pin.

11. A motor vehicle steering column unit in accordance with claim 1, wherein:
    said mounting plate is pivotably connected to said steering column jacket.

12. A motor vehicle steering column unit in accordance with claim 1, wherein:
    said mounting plate is pivotably connected to said steering column jacket by means of a pivot pin.

13. A steering column for a motor vehicle, the steering column comprising:
    a mounting plate;
    a steering column jacket with a steering wheel connection;
    an adjusting spindle;
    an electric drive unit for rotatingly driving said adjusting spindle;
    a switching device;
    a first adjusting unit arranged on the adjusting spindle and movable in an axial direction of said adjusting spindle, said first adjusting unit being connected pivotably with said mounting plate via a pivoted lever such that the axial movement of said adjusting unit is mechanically converted into a tilting movement of said steering column jacket;
    a second adjusting unit connected with said mounting plate via a fastening element such that the axial movement of said second adjusting unit is mechanically converted into a longitudinal movement of said steering column jacket, wherein one of said first adjusting unit and said second adjusting unit is a permanently connected adjusting unit in permanent functional connection with said adjusting spindle and movable relative to said adjusting spindle in the axial direction during rotation of said adjusting spindle, and the other of said first adjusting unit and said second adjusting unit is a switchable adjusting unit that can be brought into functional connection with said adjusting spindle only by activating said switching device.

14. A motor vehicle steering column unit in accordance with claim 13, wherein said pivoted lever is mounted rotatably in a flange of said mounting plate via a pivot pm.

15. A motor vehicle steering column unit in accordance with claim 13, wherein said pivoted lever is mounted rotatably at said first adjusting unit via a pivot pin.

16. A steering column for a motor vehicle, the steering column comprising:
   a mounting plate;
   a steering column jacket with a steering wheel connection;
   an electrically driven adjusting device for the longitudinal adjustment and the tilt adjustment ofthe steering column, wherein the adjusting device comprises: a one-part adjusting spindle, an electric drive unit for rotatingly driving said one-part adjusting spindle, a switching device and adjusting units arranged on the adjusting spindle and are movable in the axial direction of said adjusting spindle, said adjusting units including a first adjusting unit connected pivotably with said mounting plate via a pivoted lever such that the axial movement of said adjusting unit is mechanically converted into a tilting movement of said steering column jacket, and including a second adjusting unit connected with said mounting plate via a fastening element such that the axial movement of said second adjusting unit is mechanically converted into a longitudinal movement of said steering column jacket, wherein one of said first adjusting unit and said second adjusting unit is in permanent functional connection with said adjusting spindle and is moved in the axial direction during rotation of said adjusting spindle, and the other of said first adjusting unit and said second adjusting unit can be brought into functional connection with said adjusting spindle only by activating said switching device;
   said fastening element having an elongated hole, in which said second adjusting unit is guided such that said second adjusting unit and consequently also said steering column jacket can be moved at right angles in relation to said mounting plate.

17. A steering column for a motor vehicle, the steering column comprising:
   a mounting plate;
   a steering column jacket with a steering wheel connection;
   an electrically driven adjusting device for the longitudinal adjustment and the tilt adjustment ofthe steering column, wherein the adjusting device comprises: a one-part adjusting spindle, an electric drive unit for rotatingly driving said one-part adjusting spindle, a switching device and adjusting units arranged on the adjusting spindle and are movable in the axial direction of said adjusting spindle, said adjusting units including a first adjusting unit connected pivotably with said mounting plate via a pivoted lever such that the axial movement of said adjusting unit is mechanically converted into a tilting movement of said steering column jacket, and including a second adjusting unit connected with said mounting plate via a fastening element such that the axial movement of said second adjusting unit is mechanically converted into a longitudinal movement of said steering column jacket, wherein one of said first adjusting unit and said second adjusting unit is in permanent functional connection with said adjusting spindle and is moved in the axial direction during rotation of said adjusting spindle, and the other of said first adjusting unit and said second adjusting unit can be brought into functional connection with said adjusting spindle only by activating said switching device.

18. A motor vehicle steering column unit in accordance with claim 17, wherein said flange of said steering column jacket has a elongated hole, in which said pivot pin is guided such that said mounting plate and said steering column jacket can be displaced in parallel to one another.

19. A steering column for a motor vehicle, the steering column comprising:
   a mounting plate;
   a steering column jacket with a steering wheel connection;
   an adjusting spindle;
   an electric drive unit for rotatingly driving said adjusting spindle;
   a switching device;
   a first adjusting unit arranged on the adjusting spindle and movable in an axial direction of said adjusting spindle, said first adjusting unit being connected pivotably with said mounting plate via a pivoted lever such that the axial movement of said adjusting unit is mechanically converted into a tilting movement of said steering column jacket;
   a second adjusting unit connected with said mounting plate via a fastening element such that the axial movement of said second adjusting unit is mechanically converted into a longitudinal movement of said steering column jacket, wherein one of said first adjusting unit and said second adjusting unit is a permanently connected adjusting unit in permanent functional connection with said adjusting spindle and movable relative to said adjusting spindle in the axial direction during rotation of said adjusting spindle, and the other of said first adjusting unit and said second adjusting unit is a switchable adjusting unit that can be brought into functional connection with said adjusting spindle only by activating said switching device;
   said fastening element being rigidly connected with said mounting plate and having an elongated hole, in which said second adjusting unit is guided such that said second adjusting unit and consequently also said steering column jacket can be moved at right angles in relation to said mounting plate and said mounting plate has a flange with a pivot pin and said pivot pin is mounted rotatably in a flange of said steering column jacket and said flange of said steering column jacket has a elongated hole, in which said pivot pin is guided such that said mounting plate and said steering column jacket can be displaced in parallel to one another.

20. A steering column arrangement, the steering column arrangement comprising:
   a mounting plate;
   a steering column; p1 a linkage arrangement movably connecting said steering column to said mounting plate, said linkage arrangement including:

an adjusting spindle;

a drive unit for rotating said adjusting spindle;

a first adjusting unit arranged on said adjusting spindle and movable in an axial direction of said adjusting spindle by rotation of said adjusting spindle;

a second adjusting unit arranged on said adjusting spindle and selectively movable in an axial direction of said adjusting spindle by rotation of said adjusting spindle;

linkage connected to said mounting plate and said adjusting units, said linkage pivoting said steering column about a tilt axis with respect to said mounting plate when said first adjusting unit axially moves on said spindle and said second adjusting unit is stationary with respect to said spindle, said linkage longitudinally moving said steering column with respect to said mounting plate when said first and second adjusting units axially move on said spindle, said linkage holding said steering column rotationally fixed about said tilt axis when said first and second adjusting units axially move on said spindle.

21. An arrangement in accordance with claim 20, wherein:

said linkage performs substantially no longitudinal movements of said steering column when said first adjusting unit axially moves on said spindle and said second adjusting unit is stationary.

22. An arrangement in accordance with claim 20, wherein:

said tilt axis is perpendicular to a longitudinal axis of said steering column;

said linkage includes a fastening element connecting said second adjusting unit to said mounting plate, said fastening element holding said second adjusting unit rotationally fixed about said tilt axis when said first and second adjusting units axially move on said spindle.

23. An arrangement in accordance with claim 22, wherein:

said fastening element has an elongated hole which guides said second adjusting unit when said steering column pivots about said tilt axis.

* * * * *

UNITED STATES PATENT AND TRADEMARK OFFICE
CERTIFICATE OF CORRECTION

PATENT NO.        : 7,159,904 B2
APPLICATION NO.   : 11/082529
DATED             : January 9, 2007
INVENTOR(S)       : Schäfer et al.

It is certified that error appears in the above-identified patent and that said Letters Patent is hereby corrected as shown below:

On the title page, item [73]:
Please correct the Assignee name to read as follows:

ZF Lemförder Metallwaren AG

Signed and Sealed this

Twenty-second Day of May, 2007

JON W. DUDAS
*Director of the United States Patent and Trademark Office*